(12) United States Patent
Mizusawa

(10) Patent No.: US 7,256,688 B2
(45) Date of Patent: Aug. 14, 2007

(54) DRIVE SUPPORT DISPLAY APPARATUS

(75) Inventor: Kazufumi Mizusawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 422 days.

(21) Appl. No.: 10/474,663

(22) PCT Filed: Aug. 8, 2002

(86) PCT No.: PCT/JP02/08131

§ 371 (c)(1),
(2), (4) Date: Oct. 14, 2003

(87) PCT Pub. No.: WO03/030551

PCT Pub. Date: Apr. 10, 2003

(65) Prior Publication Data

US 2004/0150589 A1 Aug. 5, 2004

(30) Foreign Application Priority Data

Sep. 28, 2001 (JP) ............................. 2001-300283

(51) Int. Cl.
*B60Q 1/00* (2006.01)
(52) U.S. Cl. ...................... 340/461; 340/435; 340/436; 345/7; 345/629
(58) Field of Classification Search ................ 340/461; 345/629–641
See application file for complete search history.

(56) References Cited

U.S. PATENT DOCUMENTS 6,222,447 B1 * 4/2001 Schofield et al. ........... 340/461
6,369,701 B1 * 4/2002 Yoshida et al. ............. 340/435
6,693,518 B2 * 2/2004 Kumata et al. ............. 340/435

FOREIGN PATENT DOCUMENTS

| DE | 296 12 536 U1 | 10/1996 |
|---|---|---|
| EP | 0 825 064 A1 | 2/1998 |
| EP | 1 077 161 A2 | 2/2001 |
| EP | 1 158 473 A2 | 11/2001 |
| EP | 1 251 025 A2 | 10/2002 |
| EP | 1 288 618 A2 | 3/2003 |
| JP | 10-145777 | 5/1998 |
| JP | 11-338074 | 12/1999 |
| JP | 2000-78566 | 3/2000 |
| JP | 2001-114045 | 4/2001 |

* cited by examiner

*Primary Examiner*—Amr A. Awad
*Assistant Examiner*—Michael Pervan
(74) *Attorney, Agent, or Firm*—Pearne & Gordon LLP

(57) ABSTRACT

A driving assistance display apparatus enables the driver to check safety of both the rear of and a limited area around the vehicle in the final stage of parking without switching screens. A screen to display an image of the rear of a vehicle shot by a vehicle-mounted camera is divided into a main screen (10) and a sub-screen (11). A wide area image in the rear of the vehicle is displayed together with superimposed guide lines (15, 16) on the main screen (10) The image is viewpoint-converted to an image having a virtual viewpoint located above the vehicle and is displayed on the sub-screen (11) together with superimposed guide lines (15*a*, 16*a*), which are also viewpoint converted, on the sub-screen (11). Preferably, the center axis of the main screen (10) coincides with the center axis of the sub-screen (11) and the sub-screen 11 is arranged below the main screen (10).

2 Claims, 2 Drawing Sheets

DRIVE SUPPORT DISPLAY APPARATUS

TECHNICAL FIELD

The present invention relates to driving assistance display apparatus that processes an image in a rear direction of a vehicle acquired by a vehicle-mounted camera and present the image to the driver.

BACKGROUND ART

Driving assistance display apparatus has been in widespread use that provides the driver with the view at the rear of a vehicle without the driver looking into a rearview mirror, by mounting a vehicle-mounted camera, e.g. on the rear trunk of a vehicle, in a rear direction and presenting the image acquired from the vehicle-mounted camera to the driver. Some of such driving assistance display apparatus converts a real image from a vehicle-mounted camera to an image from a virtual viewpoint and display the image on a monitor. Such driving assistance display apparatus is used to assist safety in backing a vehicle and parking.

FIG. 3 shows a block diagram of a general driving assistance display apparatus. The driving assistance display apparatus includes a camera 2 mounted on a vehicle 1, image synthesis/conversion device 3 for processing an image shot by the camera 2, and a monitor 4 for displaying an image acquired after the image synthesis/conversion processing.

The camera 2 is mounted to shoot the rear of the vehicle 1. An image acquired by the camera 2 has undergone processing to remove lens distortion by the image synthesis/conversion device 3 and is converted to an image as if shot from an arbitrary virtual viewpoint and displayed on the monitor 4.

FIG. 4 is an input image to the camera 2. FIG. 5 shows an image acquired by setting a virtual viewpoint over the vehicle 1 and converting a real image to an image of the rear of the vehicle from the virtual viewpoint. An image shown in FIG. 4 is an image shot by the camera 2 as a wide angle camera without conversion. Thus the rear bumper image 5 that is actually a straight line is distorted. A guide line 6 is superimposed at the same time. The guide line 6 includes a vehicle passing guide line 7 indicating the vehicle width (body line) and a distance guide lines 8 indicating the distance from the rear of the vehicle on the road surface.

FIG. 5 shows an image acquired by viewpoint-converting the image in FIG. 4 to be seen from a virtual viewpoint. A rear bumper image is converted to a straight line image 5a. A vehicle passing guide line 7a and a distance guide lines 8a of a guide line 6a are also displayed as straight line images on the monitor 4. The driver watches the image in FIG. 5 on the monitor as he/she parks the vehicle. While a single vehicle-mounted camera is used in the example of FIG. 3, it is possible to synthesize images from a plurality of cameras and display the resulting image on the monitor.

In the conventional driving assistance display apparatus, the same screen is used to implement the procedures including safety check and parking. An image with a wide field of view of the rear of a vehicle is appropriate for safety check, while an image from a virtual viewpoint in the close proximity of a vehicle is advantageous for parking assistance. In this way, suitable images differ with purposes.

In the case of parking assistance also, an image of a wide field of view is required in order to grasp the global situation around a vehicle thus guiding the vehicle to its parking space in the initial stage of parking. In the final stage of parking, only a limited area around the vehicle must be grasped for alignment. As such, the optimum image depends on the stage of parking although a same operation procedure.

Representing an image of a wide field of view to the driver when it is necessary to grasp only a limited area around the vehicle adds to the distortion of a three-dimensional object caused by viewpoint conversion. This is impractical because it leads to a sense of incongruity in the parking procedure or failure to recognize the three-dimensional object.

To offset this, for example at least in the conventional parking procedure, an image of a wide field of view required in the initial stage of parking is switched to an image of a limited area around the vehicle as necessary. However, switching of images in the sequence of parking operation obliges the driver to understand the correspondence between images before and after the switching, which is not very favorable.

For resolving the above problem, the invention aims at providing driving assistance display apparatus that enables the driver to check safety of the rear of the vehicle and grasp the limited area around the vehicle in the final stage of parking without switching screens.

DISCLOSURE OF THE INVENTION

Driving assistance display apparatus according to the invention is intended to display an image of the rear of a vehicle shot by shooting means in the main screen area and sub-screen area as split images, characterized in that the driving assistance display apparatus comprises display control means for displaying a wide area image of the rear of the vehicle in the main screen and displaying a viewpoint-converted image of the rear of the vehicle in the sub-screen.

With this configuration, it is possible to display two types of images that suit separate purposes in the main screen area and sub-screen area in the same screen. The driver can simultaneously check the two images that suit two types of purposes on the same screen. This eliminates the need for switching screens and provides seamless assistance of driving procedure.

Preferably, the display control means superimposes guide lines to which respective relation corresponds on the main screen area and the sub-screen area and causes the center axis of the main screen area to coincide with the center axis of the sub-screen area, as well as arranges the sub-screen area below the main screen area.

With this configuration, the same guide line is displayed both in the main screen area and sub-screen area. This allows the driver to intuitively grasp the relative relation between the main screen area and sub-screen area. The travel direction of the vehicle coincides with the travel direction of field of view between the main screen and the sub-screen. This avoids irritating interruption of shift in line of sight in the screen during driving, thus providing a display screen that promises easy driving.

Preferably, the display control means arranges the sub-screen area in an upper right hand corner or an upper left hand corner of the main screen area. As the upper right hand corner and the upper left hand corner of the main screen area are prone to be distorted, the sub-screen is arranged in place of a distorted image. Therefore, the driver does not sense incongruity by the distorted image. As a result, the screen is effectively used.

Figure 1:
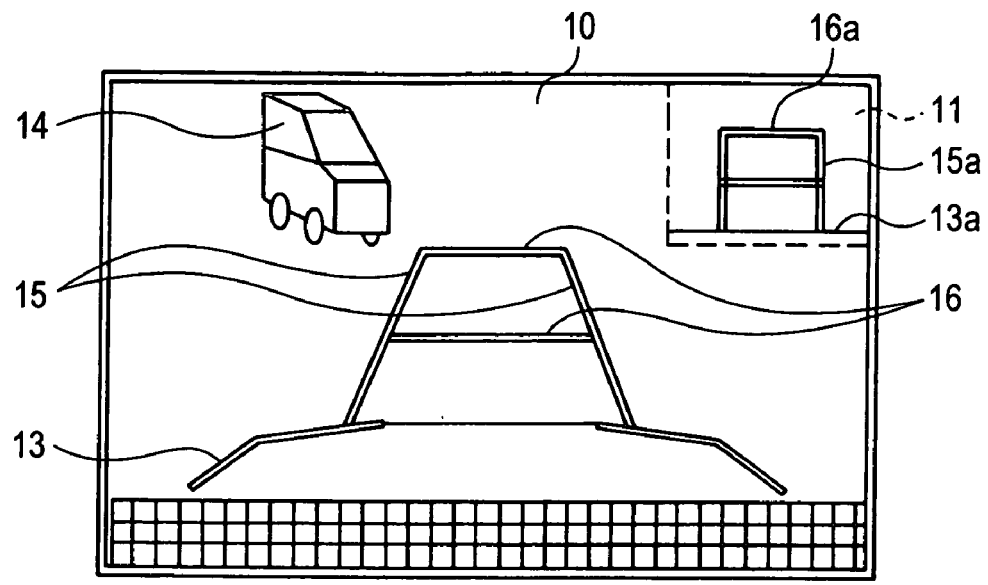
FIG. 1 is a block diagram of a display screen according to the first embodiment of the invention.

Numeral in the drawings, 1 is a vehicle, 2 is a vehicle-mounted camera, 3 is an image synthesis/conversion apparatus (image processing means), 4 is a monitor, 10 is a main screen, 11 is a sub-screen, 13, 13a are rear bumper image, 14 is an image of another vehicle, 15, 15a are vehicle passing guide line image, and 16, 16a are a distance guide line image.

BEST MODE FOR CARRYING OUT THE INVENTION

Embodiments of the invention will be described referring to drawings.

EMBODIMENT 1

Figure 3:
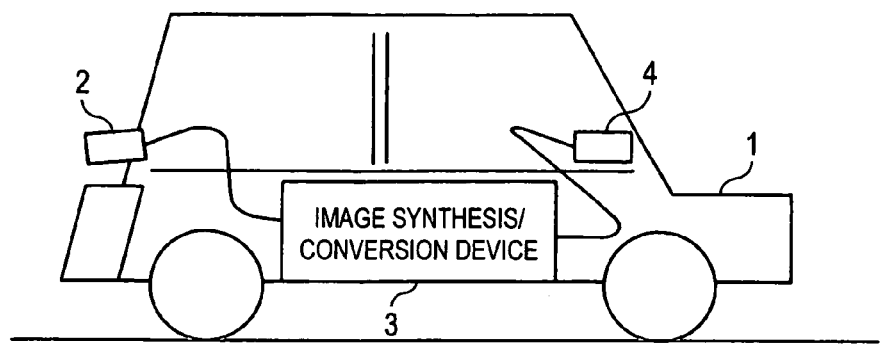
FIG. 3 is a general block diagram of a driving assistance display apparatus.

Configuration of driving assistance display apparatus according to the first embodiment of the invention is the same as that in FIG. 3. The driving assistance display apparatus according to the first embodiment includes a camera 2 mounted on a vehicle 1, an image synthesis/conversion device (display control unit) 3 for processing an image shot by the camera 2, and a monitor 4 for displaying an image acquired after the image synthesis/conversion processing.

The camera 2 is mounted to shoot the rear of the vehicle 1. An image acquired by the camera 2 has undergone processing to remove lens distortion by the image synthesis/conversion device 3 and is converted to an image as if shot from an arbitrary virtual viewpoint and displayed on the monitor 4.

FIG. 1 shows the configuration of a monitor screen display according to the first embodiment of the invention. Image synthesis/conversion device 3 of the embodiment displays an image of a wide range in the rear of the vehicle 1 and displays an image acquired by converting an image of the rear of the neighborhood of the vehicle 1 to an image from a virtual viewpoint above the vehicle. A main screen 10 and a sub-screen 11 are displayed as a single screen on the monitor 4. The driver can simultaneously watch both screens 10, 11.

Figure 4:
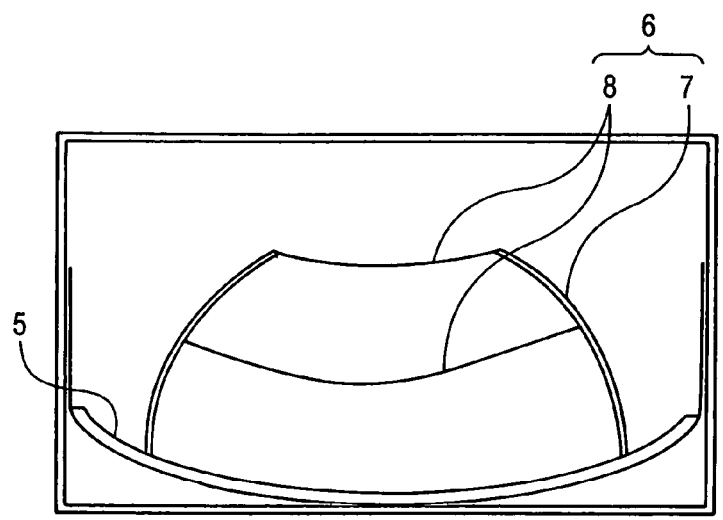
FIG. 4 explains a conventional display screen.
Figure 5:
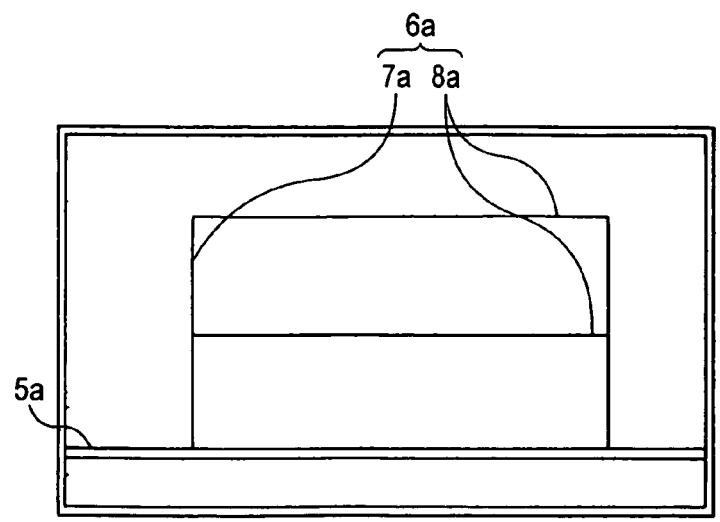
FIG. 5 explains a conventional display screen acquired after viewpoint conversion.

On the main screen 10, an image acquired by converting a wide angle image shot by the camera 2 is displayed, and the wide angle image shot by the camera 2 is converted to be obliquely viewed from above to see the rear bumper 13 and a wide range image of the rear of the vehicle 1 including the an image of another vehicle 14 around the vehicle, and is converted so that a straight line in the real space is displayed as a straight line. At the same time, guidelines composed of a vehicle passing guide line image 15 and a distance guide line image 16 similar to the guide line 6 explained in FIGS. 4 and 5 are superimposed.

On the sub-screen 11 is displayed an image of the area near the rear of the vehicle 1 where the vehicle passing guide line image 15 and the distance guide line image 16 are displayed. The image in the sub-screen 11 has undergone the conversion whereby an image of the area near the rear of the vehicle 1 is cut away and converted to a plan image from a virtual viewpoint just above the vehicle. Thus, the rear bumper image and guide line image are images 13a, 15a, 16a acquired by converting the images 13, 15, 16 for use in the sub-screen 11.

The main screen 10 is preferable for safety check of the area around the vehicle and vehicle guidance in the initial stage of parking. The sub-screen 11 is preferable mainly for use in vehicle position adjustment in the final stage of parking. With such a screen configuration, the driver checks the safety around the vehicle and guides the vehicle to its parking space while watching the main screen 10 in the initial stage of parking.

The guide lines 15, 15a, 16, 16a are used in common by the main screen 10 and the sub-screen 11. This allows the driver to recognize in a single screen the relation between the display of the guide lines 15, 15a, 16, 16a and mark images on the road surface such as a parking border line (not shown). The driver easily understands whether the on-road mark image has entered the sub-screen 11 as the vehicle 1 being backed approaches the on-road mark.

The sub-screen 11 displays an image from a virtual viewpoint. It is thus possible to correctly grasp the relative relation between the vehicle 1 and a on-road mark by using the sub-screen 11. Thus, in the final stage of parking when a on-road mark is displayed in the sub-screen 11, the driver simply shifts the line of sight from the main screen 10 to the sub-screen 11 to minutely adjust the turning angle of the vehicle 1 with respect to the parking space and the distance to a mark in the rear, based on the image display in the sub-screen 11.

In this way, this embodiment shows two types of images that suit respective purposes in a single screen at the same time. The driver has only to shift the line of sight to select an image that suits the current purpose thus seamlessly performing a parking sequence without interruption.

In this embodiment, the sub-screen is in the upper right corner of the main screen 10. This is to efficiently use the screen. An image displayed in the main screen 10 has undergone viewpoint conversion. Thus a farther image, that is, an image in the innermost area in the upper left or upper right corner, results in a more distorted image. Such an image may give the driver a sense of incongruity. So, in this embodiment, the sub-screen 10 is provided in the upper right corner instead of an image in the main screen 10.

EMBODIMENT 2

Figure 2:
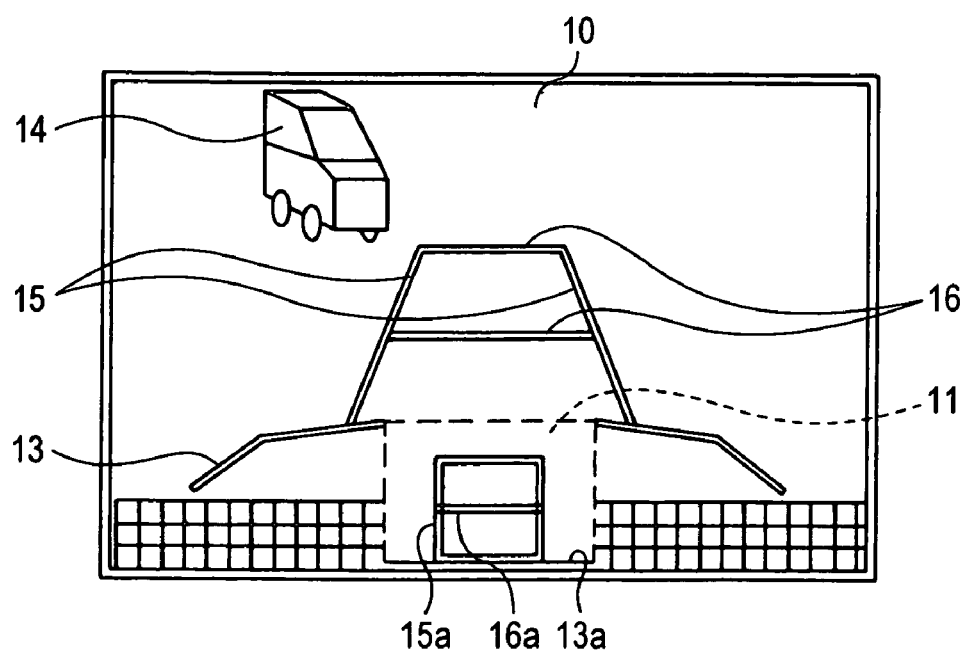
FIG. 2 is a block diagram of a display screen according to the first embodiment of the invention.

FIG. 2 shows the configuration of a monitor screen display according to the second embodiment of the invention. In the driving assistance display apparatus according to this embodiment, the sub-screen 11 is provides elsewhere than the first embodiment. In this embodiment, the center axes of the main screen 10 and the sub-screen 11 coincide with the center axis of the backing direction of the vehicle 1 and the sub-screen 11 is arranged below the main screen 10.

In case the vehicle is backed in parking procedure, an image in the main screen 10 shifts from the upper area of the screen to the position of the bumper image 13 at the bottom of the screen. Thus, the line of sight of the driver parking the vehicle while watching the image in the main screen 10 mainly shifts in vertical direction. In case the driver watches the image in the sub-screen 11 also, the line of sight of the driver shifts in vertical direction.

Screen configuration of this embodiment considers such shift of the line of sight of the driver. By causing the center axis of the main screen 1 to coincide with the center axis of the sub-screen 11 and providing a single direction of line of sight in both screens, this embodiment reduces the load on the driver. The driver can drive the vehicle while watching the screens 10, 11 or seamlessly shift the line of sight from the main screen 10 to the sub-screen 11 or from the sub-screen 11 to the main screen 10, without experiencing an interruption of a shift in line of sight.

In case the relation between the main screen 10 and the sub-screen 11 is two-dimensionally interrupted, an unskilled driver may fail to understand the correspondence between the main screen 10 to the sub-screen 11 at a glance. By using the configuration of this embodiment where the driver can watch the main screen 10 and the sub-screen 11 sequentially on a one-dimensional basis, the driver does not feel stress in shifting the line of sight and is able to intuitively grasp the correspondence between both screens.

The invention was explained in detail referring to specific embodiments. It is clear for a person skilled in the art that various alternation and modification are made without deviating from spirit and range of the invention.

This application is based on Japanese Patent Application (P2001-300283) filed on Sep. 28, 2001. The contents of the application are incorporated as references.

INDUSTRIAL APPLICABILITY

According to the invention, it is possible to use the main screen and the sub-screen in a single screen depending on the specific purpose. It is thus possible to check an image that matches the purpose in a single screen thus preferably assisting driving procedure.

The invention causes the center axis of the main screen to coincide with the center axis of the sub-screen to allow easy understanding of the correspondence between the travel direction of the vehicle and the direction of shift in the line of sight between the main screen and the sub-screen. This provides a display screen whereby driving is made easy.

The invention claimed is:

1. A driving assistance display apparatus for displaying an image from the rear of a vehicle shot by an imaging device, said driving assistance display apparatus comprising:
   a display control unit for displaying a wide area image from the rear of the vehicle in a main screen area and displaying a viewpoint-converted image of the rear of the vehicle in a sub-screen area,
   wherein the main screen area and the sub-screen area is displayed on a same display screen, wherein said display control unit arranges the sub-screen area at the bottom of the main screen area to allow sequential viewing of the main screen and the sub-screen areas, and wherein said display control unit allows the center axis of said main screen area to coincide with the center axis of said sub-screen area.

2. A driving assistance display apparatus for displaying an image from the rear of a vehicle shot by an imaging device, said driving assistance display apparatus comprising:
   a display control unit for displaying a wide area image from the rear of the vehicle in a main screen area and displaying a viewpoint-converted image of the rear of the vehicle in a sub-screen area,
   wherein the main screen area and the sub-screen area is displayed on a same display screen, wherein said display control unit arranges the sub-screen area at the bottom of the main screen area to allow sequential viewing of the main screen and the sub-screen areas, wherein said display control unit allows the center axis of said main screen area to coincide with the center axis of said sub-screen area, and wherein said display control unit superimposes a guide line to which respective relation corresponds on said main screen area and said sub-screen area.

* * * * *